United States Patent
Hoffmann et al.

(10) Patent No.: US 11,879,429 B2
(45) Date of Patent: Jan. 23, 2024

(54) ANNULAR STEEL-TOWER SEGMENT FOR A WIND TURBINE TOWER PORTION, AND METHOD

(71) Applicant: Wobben Properties GmbH, Aurich (DE)

(72) Inventors: Alexander Hoffmann, Emden (DE); Harro Harms, Wiesmoor (DE); Rene Mertens, Oranienburg (DE); Daniel Haase, Oldenburg (DE)

(73) Assignee: Wobben Properties GmbH, Aurich (DE)

( * ) Notice: Subject to any disclaimer, the term of this patent is extended or adjusted under 35 U.S.C. 154(b) by 273 days.

(21) Appl. No.: 17/432,374

(22) PCT Filed: Feb. 13, 2020

(86) PCT No.: PCT/EP2020/053723
§ 371 (c)(1),
(2) Date: Aug. 19, 2021

(87) PCT Pub. No.: WO2020/169441
PCT Pub. Date: Aug. 27, 2020

(65) Prior Publication Data
US 2023/0133759 A1    May 4, 2023

(30) Foreign Application Priority Data
Feb. 20, 2019   (DE) .................. 10 2019 104 350.6

(51) Int. Cl.
*F03D 13/20*        (2016.01)

(52) U.S. Cl.
CPC ........ *F03D 13/20* (2016.05); *F05B 2230/604* (2013.01); *F05B 2260/301* (2013.01)

(58) Field of Classification Search
CPC .. F03D 13/20; F05B 2260/301; E04H 12/085; Y02E 10/72
See application file for complete search history.

(56) References Cited

U.S. PATENT DOCUMENTS 7,387,497 B2 *   6/2008   Cone ...................... F03D 13/20
                                                      248/219.2
7,464,512 B1 *  12/2008   Perina .................... E04H 12/08
                                                        52/651.01
(Continued)

FOREIGN PATENT DOCUMENTS

CN        207715298 U       8/2018
CN        115199476 A  *  10/2022  ............ F03D 13/20
(Continued)

*Primary Examiner* — Pedro J Cuevas
(74) *Attorney, Agent, or Firm* — SEED INTELLECTUAL PROPERTY LAW GROUP LLP

(57) ABSTRACT

A steel tower ring segment for a wind turbine tower section, to a wind turbine tower section, to a wind turbine tower and to a wind turbine, and also to methods for producing a steel tower ring segment and a wind turbine tower section. A steel tower ring segment for a wind turbine tower section, comprising a first casing segment with a segment height, a segment length in the segment circumferential direction, a first segment thickness, and a first horizontal joint side, wherein the first casing segment has a first thickening region in a region adjoining the first horizontal joint side, wherein the first thickening region has a first thickening thickness, and the first thickening thickness is larger than the first segment thickness, wherein the first thickening region has a first cutout, wherein the first cutout is arranged spaced apart from the first horizontal joint side, and wherein a first passage opening leads from the first cutout to the first horizontal joint side.

20 Claims, 9 Drawing Sheets

(56) References Cited

U.S. PATENT DOCUMENTS

| | | | |
|---|---|---|---|
| 8,196,358 B2* | 6/2012 | Shiraishi | F03D 80/80 52/855 |
| 8,225,576 B2* | 7/2012 | Kristensen | F03D 13/22 52/848 |
| 8,978,315 B2* | 3/2015 | Lam | E04H 12/22 52/848 |
| 10,280,643 B2* | 5/2019 | Chase | E04H 12/12 |
| 11,118,371 B2* | 9/2021 | Kersten | E04H 12/34 |
| 11,274,658 B2* | 3/2022 | Lühn | F03D 13/20 |
| 2005/0129504 A1 | 6/2005 | De Roest | |
| 2006/0228218 A1* | 10/2006 | Cone | F03D 80/70 416/244 A |
| 2007/0294955 A1* | 12/2007 | Sportel | F03D 13/10 52/40 |
| 2008/0308696 A1* | 12/2008 | Kristensen | E04H 12/085 248/230.1 |
| 2009/0021019 A1* | 1/2009 | Thomsen | E04H 12/085 290/55 |
| 2011/0131898 A1 | 6/2011 | Nies et al. | |
| 2011/0138729 A1* | 6/2011 | Shiraishi | F03D 13/20 52/651.01 |
| 2013/0000241 A1* | 1/2013 | Jensen | F03D 13/10 52/651.01 |
| 2015/0159635 A1* | 6/2015 | Hayden | F03D 13/20 290/55 |
| 2018/0238070 A1* | 8/2018 | Chase | F03D 13/20 |
| 2020/0080335 A1 | 3/2020 | Kersten | |
| 2021/0048001 A1* | 2/2021 | Lühn | E04H 12/085 |
| 2021/0087844 A1* | 3/2021 | Kersten | F03D 13/10 |
| 2021/0148335 A1* | 5/2021 | Kersten | E04H 12/085 |

FOREIGN PATENT DOCUMENTS

| | | | | |
|---|---|---|---|---|
| DE | 102020118178 A1 * | 1/2022 | | F03D 13/20 |
| DE | 102021100799 A1 * | 7/2022 | | F03D 13/20 |
| EP | 2789134 B1 | 5/2019 | | |
| EP | 3779188 A1 * | 2/2021 | | E04H 12/085 |
| ES | 2356679 A1 | 4/2011 | | |
| WO | 2013/097866 A1 | 7/2013 | | |
| WO | 2018/172386 A1 | 9/2018 | | |

* cited by examiner

ANNULAR STEEL-TOWER SEGMENT FOR A WIND TURBINE TOWER PORTION, AND METHOD

BACKGROUND

Technical Field

The invention relates to a steel tower ring segment for a wind turbine tower section, to a wind turbine tower section, to a wind turbine tower and to a wind turbine, and also to methods for producing a steel tower ring segment and a wind turbine tower section.

Description of the Related Art

Wind turbines of the type mentioned in the introduction are well known. The presently most common type of wind turbine is the so-called horizontal-axis wind turbine, which is conventionally equipped with three rotor blades, wherein wind turbines having fewer or more rotor blades are also possible. Wind turbines have increasingly larger structural forms in order, on the one hand, to be able to achieve a higher rated power and, on the other hand, to allow better utilization of the wind.

Aside from a rotor arranged at a nacelle, wind turbines generally comprise a tower on which the nacelle with the rotor is arranged so as to be rotatable about a substantially vertically oriented axis. Towers are generally slim structures which preferably have a large height and which furthermore preferably have relatively small dimensions orthogonally to this height. Towers are preferably composed substantially of steel and/or concrete or comprise these materials. The range of tower designs extends from lattice structures via steel tubular towers with or without cable bracing to concrete structures.

Steel tubular towers may be made of a single component or multiple components or comprise such components. Towers may have cylindrical and/or conical sections, in particular along their longitudinal extent. These regions generally have ring-shaped sections. Furthermore, such ring-shaped sections may additionally also be of divided form along their circumferential direction, so that a cylindrical section is made up of different segments in the circumferential direction. Individual cylindrical and/or conical sections of towers may have, for example, individual part weights of approximately 30 t (tons) to 80 t.

Towers of wind turbines, in particular of modern horizontal-axis wind turbines, account for a major part of the total costs of producing a wind turbine. In particular, the increasing rotor diameters and hub heights of wind turbines mean that the towers are also becoming larger and, in general, are additionally also being subjected to higher loads. Towers are becoming larger firstly in terms of their height and secondly in terms of their diameter, which in many modern wind turbines is already 8 meters or greater.

Wind turbine towers therefore generally comprise multiple vertically adjacent tower segments. Said vertically adjacent tower segments are generally connected to one another by flanges arranged on the tower segments. The flanges are normally welded to the ends of the tower segments or are connected integrally to the rest of the tower wall. In order to be able to ensure the required strength of wind turbine towers, in particular of towers having the above-described dimensions, the flanges are dimensioned to be large. This ensures inter alia the required ring stiffness and/or crimping stiffness, in particular for ensuring low screw stress. This leads to a considerable outlay in terms of production and assembly.

Furthermore, the largely dimensioned flanges result in considerable material costs for the steel to be used being incurred. The largely dimensioned flanges moreover lead to narrowing of the tower interior space. By contrast to other interior spaces of components used in wind turbines, the interior space of towers is frequently used for example to route cables, to attach maintenance and assembly platforms or to accommodate components, such as for example an e-module. Furthermore, the connection of components subjected to pressure that are acted on by a bending moment, such as towers and tower sections, is to be provided by specially designed components.

Various approaches for improving the connection of tower segments exist in the prior art. WO 2018/172386 A1 describes for example a flange segment for a wind turbine steel tower ring segment with a flange projection. Furthermore, EP 2 789 134 describes a flange connection of vertically adjacent tower segments, wherein the interconnected flanges require a considerable material outlay and the connection thus gives rise to high costs.

The German Patent and Trademark Office has searched the following prior art in the priority application relating to the present application: US 2005/0129504 A1, US 2015/0159635 A1, EP 2 798 134, WO 2013/097 866 A1, WO 2018/172 386 A1.

BRIEF SUMMARY

Provided is a steel tower ring segment for a wind turbine tower section, a wind turbine tower section, a wind turbine tower and a wind turbine, and also methods for producing a steel tower ring segment and a wind turbine tower section which alleviate or eliminate one or more of the stated disadvantages. Provided are techniques making possible a wind turbine tower with higher strength and/or a more assembly-friendly design and/or a weight-reduced design.

According to a first aspect, provided is a steel tower ring segment for a wind turbine tower section that comprises a first casing segment with a segment height, a segment length in the segment circumferential direction, a first segment thickness, and a first horizontal joint side, wherein the first casing segment has a first thickening region in a region adjoining the first horizontal joint side, wherein the first thickening region has a first thickening thickness, and the first thickening thickness is larger than the first segment thickness, wherein the first thickening region has a first cutout, wherein the first cutout is arranged spaced apart from the first horizontal joint side, and wherein a first passage opening leads from the first cutout to the first horizontal joint side.

The first casing segment extends in the direction of the segment height and of the first segment thickness and in the segment circumferential direction. In the state of installation of the wind turbine tower section in a wind turbine tower, the first segment thickness preferably extends substantially in a radial direction of the wind turbine tower. The segment height preferably extends substantially parallel to a tower longitudinal axis. Slight deviations from the parallelism of the segment height and a tower longitudinal axis can arise from a conically formed wind turbine tower section.

The segment length in the segment circumferential direction is to be understood as being in particular a curve length, since casing segments for wind turbine tower sections are frequently curved. The first casing segment may have a ring-shaped cross section, wherein a ring-shaped cross section may also be of polygonal form. Furthermore, the first casing segment may have a part-ring-shaped cross section. The casing segment preferably extends from a lower end to an upper end in the direction of the segment height. The first horizontal joint side is formed on the lower end or on the upper end. The first horizontal joint side is formed in particular in such a way that, with this, abutment against a second horizontal joint side of a second casing segment is possible. In particular, two casing segments can be arranged against one another by means of said horizontal joint sides.

The first casing segment has a first thickening region in a region adjoining the first horizontal joint side. The thickening region is distinguished in particular in that it has a larger material thickness than the rest of the wall regions of the casing segment. Preferably, the wall thickness of the casing segment is increased from the remaining wall regions with the segment thickness to the thickening region with the first thickening thickness, which is larger than the first segment thickness.

The first thickening region has the first cutout. The first cutout preferably extends in the direction of the first segment thickness, in the segment circumferential direction and in the direction of the segment height. The cutout may be open on one side or on two sides. Preferably, the first cutout is configured to be open on one side and, in the operating state of the steel tower ring segment, can be accessible from the interior of a wind turbine tower. Alternatively or additionally, the first cutout may be arranged in such a way that, in the operating state of the steel tower ring segment, it is accessible from an outer side of the wind turbine tower. The first cutout is configured to be open in the radial direction of the tower and/or in the direction of the segment thickness and/or of the thickening thickness.

The first cutout is spaced apart from the first horizontal joint side. The first fastening side of the cutout, which first fastening side faces toward the horizontal joint side, is preferably spaced more than 5 cm, more than 10 cm, more than 20 cm, more than 30 cm, more than 40 cm, and/or more than 50 cm, apart from the first horizontal joint side.

The first passage opening leads from the first cutout to the first horizontal joint side. The first passage opening preferably has two open ends, wherein a first end adjoins the first cutout and a second end adjoins the first horizontal joint side. The first passage opening is preferably formed in such a way that a fastening element, in particular a bolt with a thread, can extend from the first cutout through the passage opening to the first horizontal joint side. Preferably, the first passage opening has a first passage axis, wherein the first passage axis leads at least partially through a wall of the first casing segment.

The connections of known wind turbine tower sections have an unfavorable force flow. The force flow directed in the tower walls is not parallel to the force flow of the connection elements which interconnect the two flanges abutting one another. This misalignment of the force flow lines gives rise to lever effects. Said lever effects lead inter alia to the need for the flanges to be of particularly large dimensions.

Known flange connections reduce the structural space within a wind turbine tower. At the towers, which are subjected to pressure and to a bending moment, known connections cannot be used, or can be used only with adaptations, since, for example, said connections can loosen.

Through the aforementioned cutouts in the thickening region of the steel tower ring segment, the axis of a fastening element which is guided through the first passage opening is moved into the direction of the main force flow line of the steel tower ring segment. This gives rise to the possibility that the main force flow line of the steel tower ring segment substantially coincides with the connection axis of connecting elements. In particular, it is possible for the horizontal spacing of said force flow lines to be smaller or eliminated.

The aforementioned steel tower ring segment advantageously leads to a reduced usage of material. In this way, the production is simplified and, furthermore, material costs are saved. It has furthermore been found that, with the connection of two adjacent steel tower ring segments, a reduction in the number of screws of 25% can be achieved, since the required connection forces are smaller. Overall, this can result in a considerable reduction in weight. This is advantageous in particular in the case of large dimensions, where weight limits, for example for transportation, exist. Furthermore, the load-bearing capacity of the connection to be formed is advantageously improved. As a result of the improved force flow, it is furthermore the case that the longevity of a wind turbine having such a steel tower ring segment is improved. Furthermore, the steel tower ring segment can advantageously be mounted more easily, for example already as a result of the reduced number of screws.

According to a preferred embodiment variant, it is provided that the first passage opening has a passage axis which is oriented substantially parallel to the segment height. The passage axis, oriented parallel to the segment height, of the first passage opening allows an advantageous force flow. The force flow can run substantially straight without running, in relatively large sections, at an angle to rest of the force flow. In this way, further saving of material is possible, and the connection is generally durable.

According to a preferred development of the steel tower ring segment, it is provided that the first cutout extends completely through the first thickening region in the direction of the first segment thickness. A first cutout formed in this way has a first opening and a second opening, in particular in the direction of the segment thickness. During intended operation of the steel tower ring segment, the first cutout may have one or two covers. A first cutout in the form of a passage has the advantage that this can be formed in a favorable manner in terms of production.

According to a further preferred embodiment variant of the steel tower ring segment, it is provided that a first fastening side, facing toward the first horizontal joint side, of the first cutout has a planar surface, wherein preferably the planar surface adjoins the passage opening, and/or the first fastening side is of concave form, and preferably a transverse bolt with a convex bearing side can be arranged on the first fastening side, and/or the first fastening side is of trough-like form, wherein a trough base is oriented in the direction of the first thickening thickness, and the cross section orthogonal to the direction of the first thickening thickness is of semicircle-like form, and preferably a transverse bolt with a semicircle-like cross section can be arranged on the first fastening side. Preferably, that side of the cutout which faces away from the fastening side is of concave form. Preferably, orthogonally to the direction of the thickening thickness and/or of the segment thickness, the cutout has an oval and/or racetrack-shaped cross section.

The planar surface of the first cutout is preferably formed in such a way that a force-distributing element, for example a washer, can be arranged thereon such that the force-distributing element can be arranged between the planar surface and a screw head.

The first fastening side of concave form has the advantage that, for connection of the steel tower ring segment to an adjacent steel tower ring segment, a transverse bolt can advantageously be affixed on the first fastening side. Preferably, the cross section of the concave fastening side is configured to correspond to a convex bearing side of a transverse bolt.

The trough-like first fastening side preferably has, orthogonally to the direction of the trough base, a fastening-side cross section that is preferably of semicircle-like form. A first fastening side formed in this manner advantageously allows the arrangement of a transverse bolt which, in combination with a threaded bolt, allows an advantageous connection to an adjacent steel tower ring segment.

A further preferred development of the steel tower ring segment provides that the first thickening region has a first transition region, wherein, in the transition region, a casing segment thickness increases, preferably increases continuously, from the first segment thickness to the first thickening thickness.

The first thickening thickness is larger than the first segment thickness. The segment thickness describes in particular the thickness of the casing segment between two opposite thickening regions of a steel tower ring element that adjoin the horizontal joint sides. The steel tower ring segment has the thickening thickness only adjacent to the horizontal joint sides. In order to ensure a transition from the segment thickness to the thickening thickness that is optimized in terms of force flow, this preferred development provides the first transition region. The transition region may assume a straight, convex or concave form.

In a further development of the steel tower ring segment, it is provided that, proceeding from the first horizontal joint side, a first fastening opening, which is preferably in the form of a blind hole, is arranged in the first thickening region, the fastening opening axis of which is oriented substantially parallel to the passage axis of the first passage opening, and the first fastening opening is arranged offset from the first passage opening in the segment circumferential direction.

The first fastening opening is provided in particular for receiving a fastening element which, proceeding from a second cutout of a second steel tower ring segment, can extend through a second passage opening to the first fastening opening. Two vertically adjacent steel tower ring segments have, preferably, and, as will be explained in more detail further below, in each case, cutouts with passage openings through which fastening elements can be guided and said fastening elements end in fastening openings of the adjacent steel tower ring segment. The first fastening opening preferably has an inner thread. In particular, the fastening opening is configured to receive a fastening element, in particular a threaded bolt or a screw.

In a further preferred embodiment variant of the steel tower ring segment, it is provided that, orthogonally to the segment height and orthogonally to the segment circumferential direction, the casing segment extends in a radial direction, and, radially, the first thickening region projects in a first direction and in a second direction, which is directed oppositely to the first direction, and preferably the first thickening region projects with the same projection length in the first direction and in the second direction. The radial direction is preferably parallel to the direction of the thickening thickness and/or of the segment thickness.

In this preferred embodiment variant, a steel tower ring segment cross section which is configured orthogonally to the segment circumferential direction has the geometry of an inverted T. Preferably, the transition region, which, as already described above, may have a straight, a convex or a concave profile, is arranged between the flanks of the T and the central region of the T.

Furthermore, it is preferable for the steel tower ring segment to comprise a multiplicity of first passage openings and/or a multiplicity of first fastening openings.

According to a further aspect, provided is a wind turbine tower section comprising a first steel tower ring segment according to at least one of the embodiment variants described above, a second steel tower ring segment which comprises a second casing segment with a segment height, with a segment length in the segment circumferential direction, with a second segment thickness, and with a second horizontal joint side, wherein the second casing segment has a second thickening region in a region adjoining the second horizontal joint side, wherein the second thickening region has a second thickening thickness which is larger than the second segment thickness, wherein, proceeding from the second horizontal joint side, a second fastening opening, which is preferably in the form of a blind hole, is arranged in the second thickening region, wherein the first steel tower ring segment and the second steel tower ring segment about against one another with the first horizontal joint side and the second horizontal joint side in such a way that the first passage opening and the second fastening opening share a common passage axis, and wherein a first fastening element is arranged in the first passage opening and in the second fastening opening in such a way that the first steel tower ring segment and the second steel tower ring segment are connected to one another.

The second segment thickness is preferably identical to the first segment thickness. Alternatively preferably, the second segment thickness is smaller or larger than the first segment thickness.

The first thickening region and the second thickening region are arranged adjacent to one another. The first fastening element is preferably a screw which, proceeding from the first cutout, extends through the first passage opening and is screwed in a thread of the second fastening opening. Furthermore, the first fastening element may be in the form of a threaded bolt.

It is furthermore preferable for a second cutout to be arranged in the second thickening region, wherein a second passage opening leads from the second cutout to the second horizontal joint side, proceeding from the first horizontal joint side, a first fastening opening, which is preferably in the form of a blind hole, is arranged in the first thickening region, wherein the first fastening opening is arranged offset from the first passage opening in the segment circumferential direction, the first passage opening and the second passage opening are arranged offset from one another in the segment circumferential direction, and a second fastening element is arranged in the second passage opening and the first fastening opening.

The second fastening element is preferably a screw which, proceeding from the second cutout, extends through the second passage opening and is screwed in a thread of the first fastening opening. The second fastening element may also be a threaded bolt, which furthermore is preferably arranged with a nut. The threaded bolt may be screwed in in advance. Chips can still be present in the first fastening opening after production. Said chips can reduce the screw-in depth and thus lead to blockage of a screw, wherein this can be ascertained only with difficulty. The threaded bolts may be fitted in advance and the screw-in depth checked at the same time. The threaded bolt and the nut may be specially coated so that the coefficients of friction of the thread are reduced.

In this preferred development, the fastenings of the first steel tower ring segment to the second steel tower ring segment are configured analogously to the connection of the second steel tower ring segment to the first steel tower ring segment. In these preferred embodiment variants, both steel tower ring segments have cutouts, proceeding from which fastening elements extend through the passage openings to the fastening openings of the in each case other steel tower ring segment.

In a further preferred development of the wind turbine tower section, it is provided that the first fastening element is arranged firmly, and preferably releasably, in the second fastening opening and projects into the first cutout through the first passage opening, and a first transverse bolt with a transverse bolt opening is arranged in the first cutout, and the first fastening element extends through the transverse bolt opening, and the first fastening element is coupled to the transverse bolt in such a way that they bring about a firm connection between the first steel tower ring segment and the second steel tower ring segment. The transverse bolt opening is preferably arranged so as to be coaxial with the first passage opening.

The first fastening element is preferably in the form of a threaded bolt. The threaded bolt preferably has a thread in the region adjoining its first end and its second end. The threaded bolt is screwed by one end into a thread of the second fastening opening. The first fastening element thereby projects from the second horizontal joint side. The first steel tower ring segment is arranged on the second steel tower ring segment in such a way that that section of the first fastening element which projects from the second horizontal joint side extends through the first passage opening to the first cutout.

The first fastening element projects with one end into the first cutout. The first transverse bolt with the transverse bolt opening is also arranged in the first cutout. The first fastening element projects through the transverse bolt opening in such a way that one end of the fastening element projects vertically above or below the transverse bolt. This projecting end of the fastening element is coupled to the transverse bolt. Preferably, this end of the fastening element is connected to a nut or an expansion sleeve. The nut or the expansion sleeve has a thread which corresponds to the thread of the first fastening element. By way of the screwing-on of the nut or the expansion sleeve, that surface of the nut or of the expansion sleeve which faces toward the first horizontal joint side reaches the transverse bolt. In this way, a firm connection of the first fastening element in the second fastening opening and in the first cutout can be achieved such that a firm connection between the first steel tower ring segment and the second steel tower ring segment is achieved. The first fastening element may be in the form of a threaded bolt.

According to a further preferred development of the wind turbine tower section, it is provided that the first fastening side has a concave cross section, and the transverse bolt has a convex bearing side which corresponds to the first fastening side. A transverse bolt formed in this manner can be arranged in a positionally accurate manner in the first cutout. Furthermore, it is preferable for the second fastening side to have a concave cross section and for a second transverse bolt to have a convex bearing side which corresponds to the second fastening side. This preferred development simplifies the assembly of the wind turbine tower section, so that costs and time can be saved here.

According to a further aspect, provided is a wind turbine tower comprising at least one wind turbine tower section according to at least one of the embodiment variants described above.

According to a preferred embodiment variant of the wind turbine tower, it is provided that the tower section is arranged in a region adjoining a lower end of the tower, in particular adjoining a tower foundation. Preferably, said region, proceeding from the lower end, extends in the vertical direction by less than 10%, less than 20%, less than 30%, less than 40%, less than 50%, less than 60%, less than 70% or less than 80% of the length of the tower.

Provided is a wind turbine comprising a wind turbine tower according to the aspect described above.

Provided is a method for producing a steel tower ring segment for a wind turbine tower section that comprises providing a casing segment having a first thickening region which adjoins a first horizontal joint side, forming a first cutout in the first thickening region, wherein the first cutout is spaced apart from the first horizontal joint side, forming a first passage opening which leads from the first cutout to the first horizontal joint side.

Provided is a method for producing a wind turbine tower section that comprises providing a first steel tower ring segment according to at least one of the embodiment variants described above, providing a second steel tower ring segment which comprises a second casing segment with a segment height, with a segment length in the segment circumferential direction, with a second segment thickness, and with a second horizontal joint side, wherein the second casing segment has a second thickening region in a region adjoining the second horizontal joint side, wherein the second thickening region has a second thickening thickness which is larger than the second segment thickness, wherein, proceeding from the second horizontal joint side, a second fastening opening, which is preferably in the form of a blind hole, is arranged in the second thickening region, arranging the first steel tower ring segment and the second steel tower ring segment with the first horizontal joint side and the second horizontal joint side against one another in such a way that the first passage opening and the second fastening opening share a common passage axis, arranging a fastening element in the first passage opening and in the second fastening opening, in particular inserting and/or screwing a screw firstly in the first passage opening and then in the second fastening opening, or inserting and/or screwing in a threaded bolt.

According to a further aspect, provided is a method for producing a wind turbine tower section that comprises providing a first steel tower ring segment according to at least one of the embodiment variants described above, providing a second steel tower ring segment which comprises a second casing segment with a segment height, with a segment length in the segment circumferential direction, with a second segment thickness, and with a second horizontal joint side, wherein the second casing segment has a second thickening region in a region adjoining the second horizontal joint side, wherein the second thickening region has a second thickening thickness which is larger than the second segment thickness, wherein, proceeding from the second horizontal joint side, a second fastening opening, which is preferably in the form of a blind hole, is arranged in the second thickening region, arranging a transverse bolt with a transverse bolt opening in the first cutout, fastening, in particular by screwing-in, a first fastening element, in particular a threaded bolt, in the second fastening opening, arranging the first horizontal joint side and the second horizontal joint side against one another in such a way that the first fastening element projects into the first cutout through the first passage opening and the transverse bolt opening, arranging a fixing element, for example a nut and/or an expansion sleeve, on the fastening element in such a way that the first steel tower ring segment and the second steel tower ring segment are connected to one another.

The method and its possible developments have features or method steps that make them particularly suitable for being used for a steel tower ring segment mentioned above and its developments. For further advantages, design variants and design details of these further aspects and their possible developments, reference is also made to the description given above concerning the corresponding features and developments of the steel tower ring segment.

BRIEF DESCRIPTION OF THE SEVERAL VIEWS OF THE DRAWINGS

Preferred exemplary embodiments will be discussed by way of example on the basis of the appended figures. In the figures.

In the figures, identical or substantially functionally identical or similar elements are denoted by the same reference signs.

DETAILED DESCRIPTION

Figure 1:
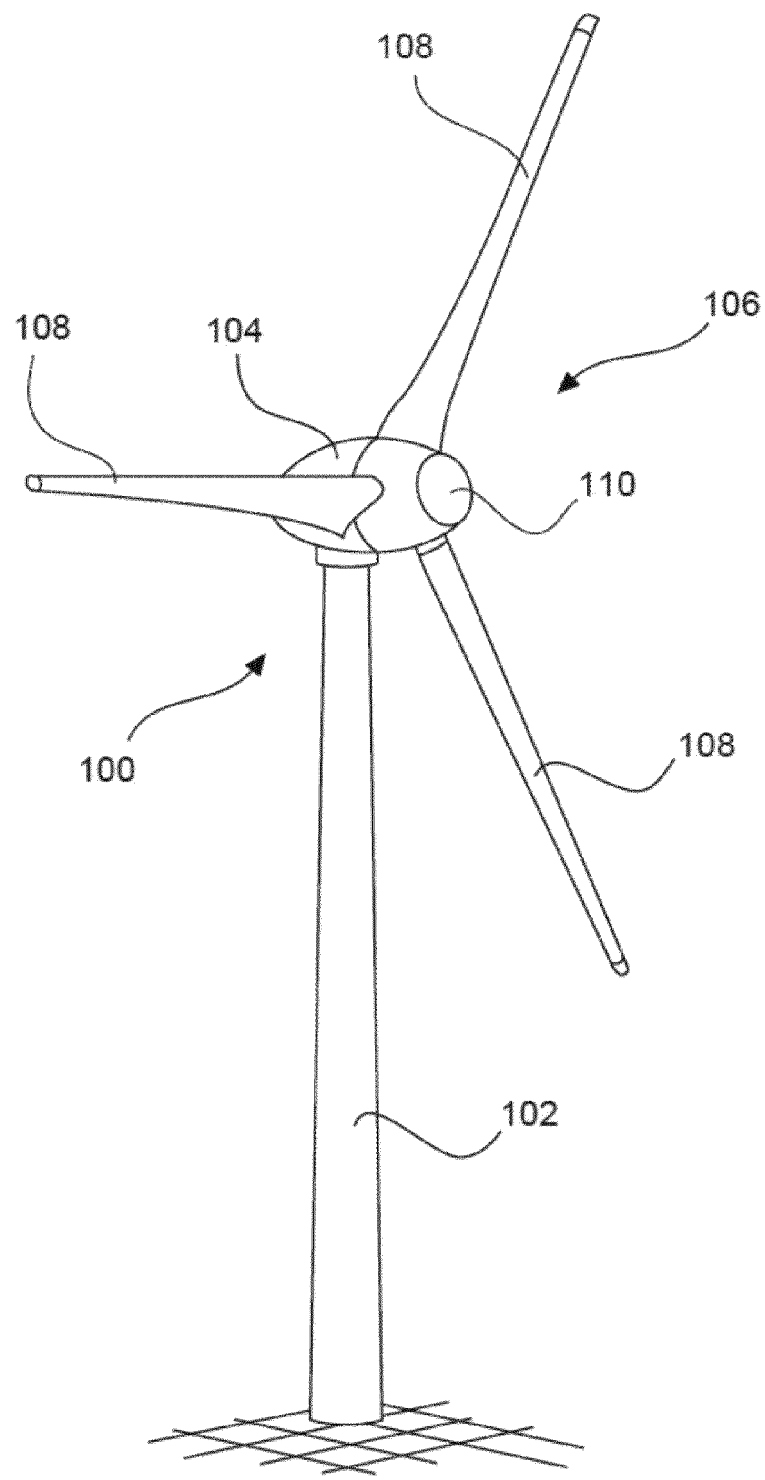
FIG. 1 shows a schematic three-dimensional view of an exemplary embodiment of a wind turbine.

FIG. 1 shows a schematic illustration of a wind turbine. FIG. 1 shows a wind turbine 100 having a tower 102 and having a nacelle 104. A rotor 106 having three rotor blades 108 and having a spinner 110 is arranged on the nacelle 104. During operation, the rotor 106 is set in rotational motion by the wind and in this way drives a generator in the nacelle 104. The tower 102 comprises a tower section 120. The tower section 120 comprises a first steel tower ring segment 122 and a second steel tower ring segment 124. Exemplary embodiment variants of the tower section 120 and of the steel tower ring segments 122, 124 emerge from the description above and from the description below.

Figure 2:
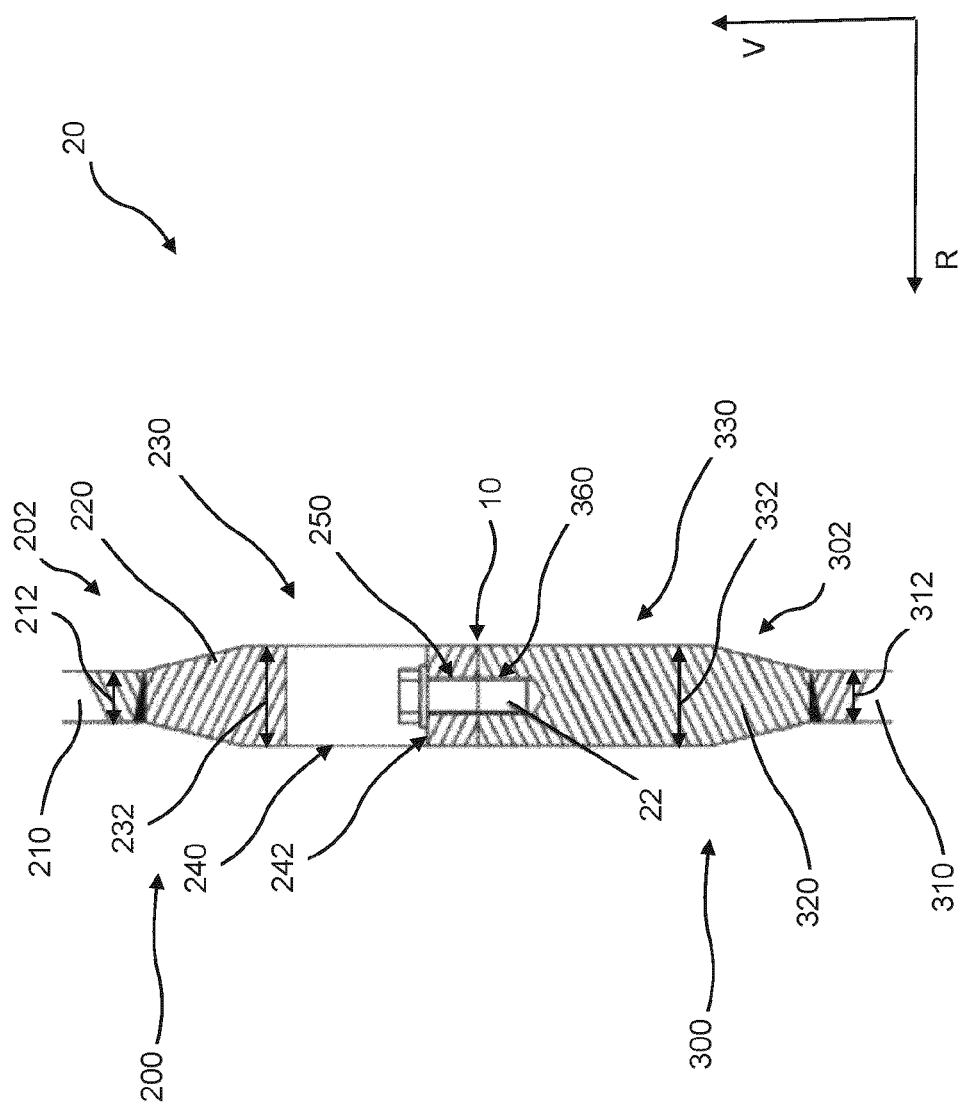
FIG. 2 shows a schematic two-dimensional view of an exemplary embodiment of a wind turbine tower section.

FIG. 2 shows a schematic two-dimensional view of a wind turbine tower section. The tower section 20 comprises a first steel tower ring segment 200 and a second steel tower ring segment 300. The first steel tower ring segment 200 and the second steel tower ring segment 300 abut against one another with their horizontal joint sides at a joint 10. The first steel tower ring segment 200 comprises a first casing segment 202. The first casing segment 202 extends with a segment height in the vertical direction V, wherein a section of the first casing segment 202 that faces away from the joint 10 is not shown. In the radial direction R, the casing segment 202 extends with a segment thickness 212, and with a thickening thickness 232 in the thickening region 230. Orthogonally to the vertical direction V and to the radial direction R, the casing segment 202 extends with a segment length in the segment circumferential direction into the plane of the drawing.

The first casing segment 202 has the first thickening region 230 in the region adjoining the first horizontal joint side, that is to say adjoining the joint 10. The first thickening region 230 has the first cutout 240. The first cutout 240 is in the form of a passage cutout, so that this extends from an inner side of the tower section 220 to an outer side of the tower section 220. The first cutout 240 moreover forms a first fastening side 242 which faces toward the first horizontal joint side.

Proceeding from the first cutout 240, a first passage opening 250 leads to the horizontal joint side. The first passage opening 250 has two open ends. A first open end adjoins the first cutout 240 and thereby ends the first passage opening 250 with a first end at the first fastening side 242. With the other, second end, the passage opening 250 ends at the first horizontal joint side. In the radial direction R, the thickening region 230 has a larger material thickness 232 than the rest of the segment wall 210 with its segment thickness 212.

The transition from the rest of the segment wall 210 to the thickening region 230 is formed by a transition region 220. The transition region 220 has a thickness which increases from the first segment thickness 210 to the first thickening thickness 232. Here, in the present case, this increase is linear. The transition may however also be of concave or convex form in the perspective shown in FIG. 2.

The second steel tower ring segment 300 has a second casing segment 302. The second casing segment 302 extends, analogously to the first steel tower ring segment 200, with a segment height in the vertical direction V, with a segment length in the segment circumferential direction into or out of the plane of the drawing, and with a second segment thickness 312, and with a thickening thickness 332 in the thickening region 330, in the radial direction R. Preferably, the majority of the second steel tower ring segment 300 has a second segment thickness 312 which is smaller than the second thickening thickness 332. Analogously to the first steel tower ring segment 200, a transition region 320 is arranged between the thickening region 330 and the rest of the second segment wall 310.

The second steel tower ring segment has, proceeding from its horizontal joint side, a second fastening opening 360, which is in the form of a blind hole. The fastening opening axis of the fastening opening 360 is oriented substantially in the vertical direction V.

Through the intended arrangement of the first and second steel tower ring segments 200, 300, the fastening opening axis of the second fastening opening 360 and a passage axis of the first passage opening 250 are arranged in a substantially coaxial manner.

A first fastening element 22 is arranged in the first passage opening 250 and the second fastening opening 360. The first fastening element is in the form of a screw. Proceeding from the first cutout 240, the screw 22 is guided through the first passage opening 250 and is screwed into a thread of the second fastening opening 360. By way of this screw connection, the first steel tower ring segment 200 and the second steel tower ring segment 300 are connected to one another.

Figure 3:
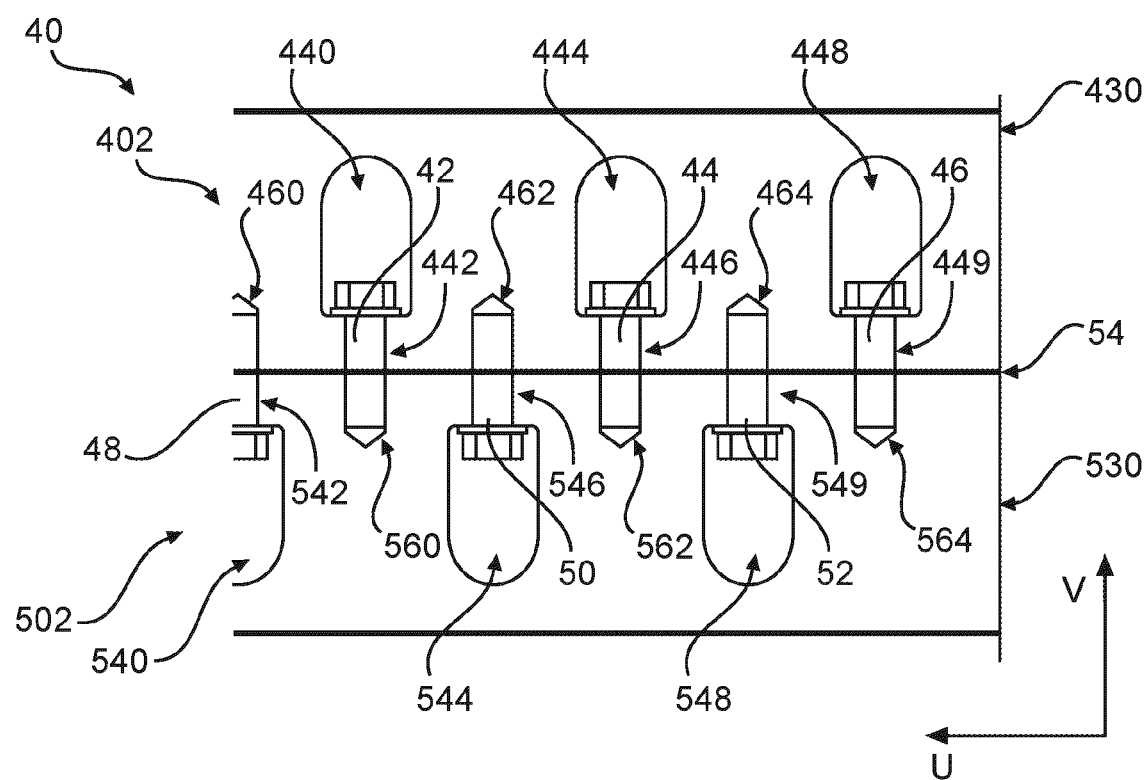
FIG. 3 shows a further schematic two-dimensional view of an exemplary embodiment of a wind turbine tower section.

FIG. 3 shows a further schematic two-dimensional view of a wind turbine tower section. The tower section 40 has a first steel tower ring segment with a first casing segment 402 and has a second steel tower ring segment with a second casing segment 502. The first casing segment 402 has the first thickening region 430 in a region adjoining a first horizontal joint side.

The second casing segment 502 has a second thickening region 530 in a region adjoining its second horizontal joint side. The first casing segment 402 and the second casing segment 502 abut against one another with their horizontal joint sides at a substantially horizontal joint 54. The first casing segment 402 and the second casing segment 502 each extend with a segment height in the vertical direction V, with a segment length in the segment circumferential direction U, and in the direction of a first and second segment thickness and thickening thickness, wherein the thickness is oriented into or out of the plane of the drawing. The segment circumferential direction U is preferably curved. Preferably, the tower section 40 is a circular ring segment, so that the segment circumferential direction is in each case oriented in a tangential direction at individual points of the tower section 40.

The first casing segment 402 has, spaced apart in the segment circumferential direction, three cutouts 440, 444, 448. Proceeding from the cutouts 440, 444, 448, first passage openings 442, 446, 449 lead to the first horizontal joint side.

The first casing segment 402 has first fastening openings 460, 462, 464 which, proceeding from the first horizontal joint side, extend into the thickening region 430. The first fastening openings 460, 462, 464 are in the form of blind holes. The first fastening openings 460, 462, 464 have fastening opening axes which are oriented substantially parallel to the vertical direction V. A fastening opening of the fastening openings 460, 462, 464 is in each case arranged between two passage openings 442, 446, 449. Fastening openings 460, 462, 464 and passage openings 442, 446, 449 are arranged so as to alternate in the circumferential direction U. The fastening sides, facing toward the first horizontal joint side, of the cutouts 440, 444, 448 are arranged at the same height with respect to the segment height in the vertical direction V.

The second casing segment 502 has second cutouts 540, 544, 548 which are spaced apart from one another in the segment circumferential direction U. The fastening sides, facing toward the second horizontal joint side, of the cutouts 540, 544, 548 are arranged at the same height with respect to the segment height in the vertical direction V.

The second casing segment 502 furthermore has second fastening openings 560, 562, 564. The fastening opening 560 is arranged between the passage opening 542 and the passage opening 546. The spacing of the fastening opening 560 to the first adjacent passage opening 542 is identical to the spacing to the second adjacent passage opening 546. Analogously to this, the fastening opening 562 is arranged between the passage opening 546 and the passage opening 549.

The passage openings 442, 446, 449 of the first casing segment 402 are arranged in such a way that they are arranged in relation to the correspondingly arranged fastening openings 560, 562, 564 in such a way that in each case a passage opening 442, 446, 449 of the first casing segment 402 and an associated fastening opening 560, 562, 564 of the second casing segment 502 share a coaxial axis. Owing to this, it is possible for a fastening element 42, 44, 46 to lead through a first passage opening 442, 446, 449 to a second fastening opening 560, 562, 564 and to be able to be screwed into the fastening openings 560, 562, 564. In the present case, the fastening elements 42, 44, 46 are in the form of screws.

Analogously to this, proceeding from the cutouts 540, 544, 548 of the second casing segment 502, fastening elements 48, 50, 52 are guided through the second passage openings 442, 546, 549 to the first fastening openings 460, 462, 464 of the first casing segment 402. In this way, a firm connection of the steel tower ring segments is made possible.

Figure 4:
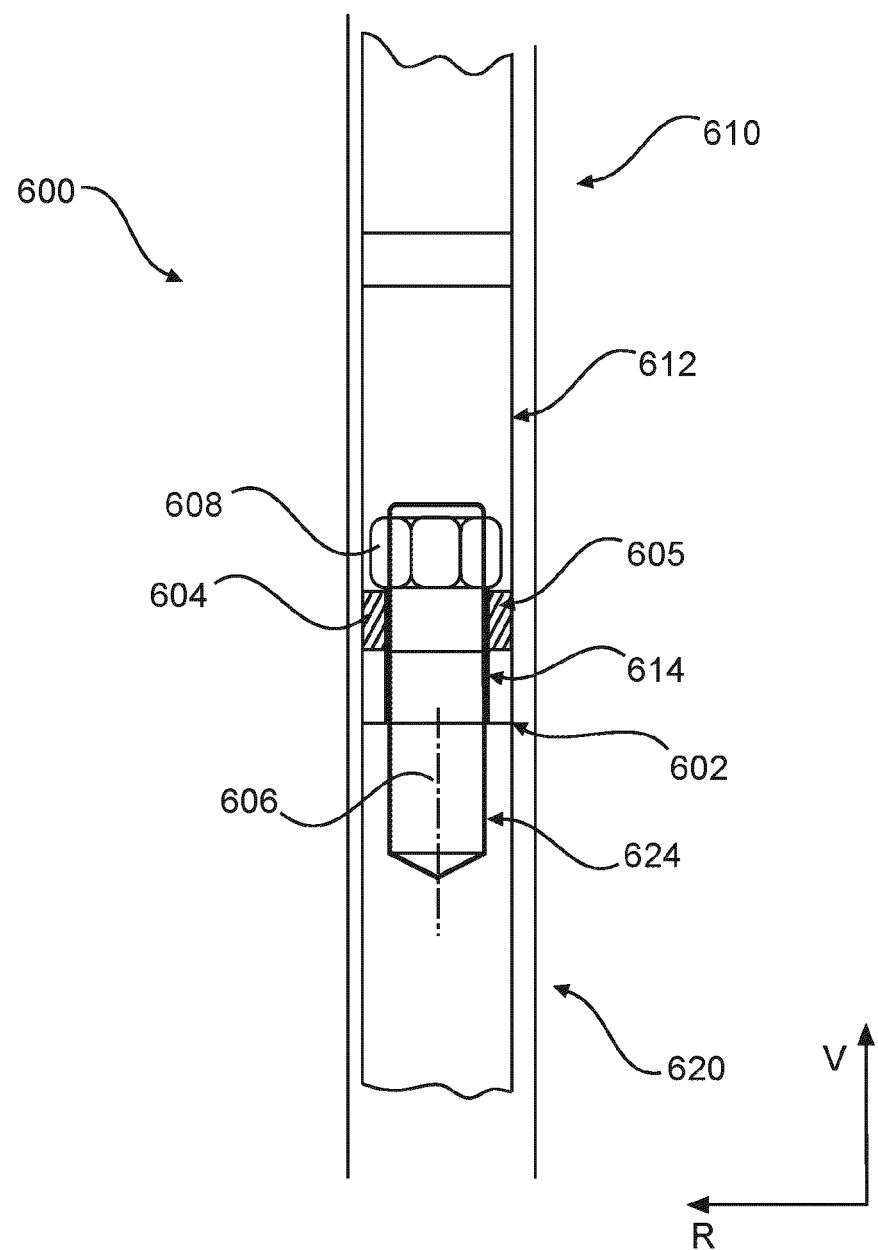
FIG. 4 shows a schematic two-dimensional detail view of an exemplary embodiment of a wind turbine tower section.

FIG. 4 shows a schematic two-dimensional detail view of a wind turbine tower section. The tower section 600 comprises a first casing segment 610 of a first steel tower ring segment and a second casing segment 620 of a second steel tower ring segment. The first casing segment 610 has a first cutout 612 in a thickening region. Proceeding from the first cutout 612, a first passage opening 614 extends to a first horizontal joint side of the first casing segment 610, which meets a second horizontal joint side of the second casing segment 620 at a joint 602.

The second casing segment 620 has a second fastening opening 624. The first passage opening 614 and the second fastening opening 624 share a coaxially oriented axis. A first transverse bolt 604 is arranged in the first cutout 612. A first fastening element 606 is fastened in the second fastening opening 624. Preferably, the first fastening element 606 has a thread by way of which it is screwed into a corresponding thread of the second fastening opening 624.

Proceeding from the fastening in the second fastening opening 624, the first fastening element 606 extends into the cutout 612 through the first passage opening 614. The transverse bolt 604 has a transverse bolt opening 605 which is arranged and formed so as to have a passage axis which is oriented so as to be coaxial with the axes of the fastening opening 624 and of the first passage opening 614. The first fastening element likewise extends through the transverse bolt opening 605.

A nut 608 is arranged on that end of the first fastening element 606 which faces away from the second casing segment 620. At said end of the fastening element 606, the latter preferably likewise has a thread. The nut 608 is screwed onto said thread. The nut is supported at its side facing toward the second steel tower ring segment on the transverse bolt 604. Screwing the nut 608 onto the fastening element 606 generates a tension such that a firm connection between the first steel tower ring segment and the second steel tower ring segment is realized.

Figure 5:
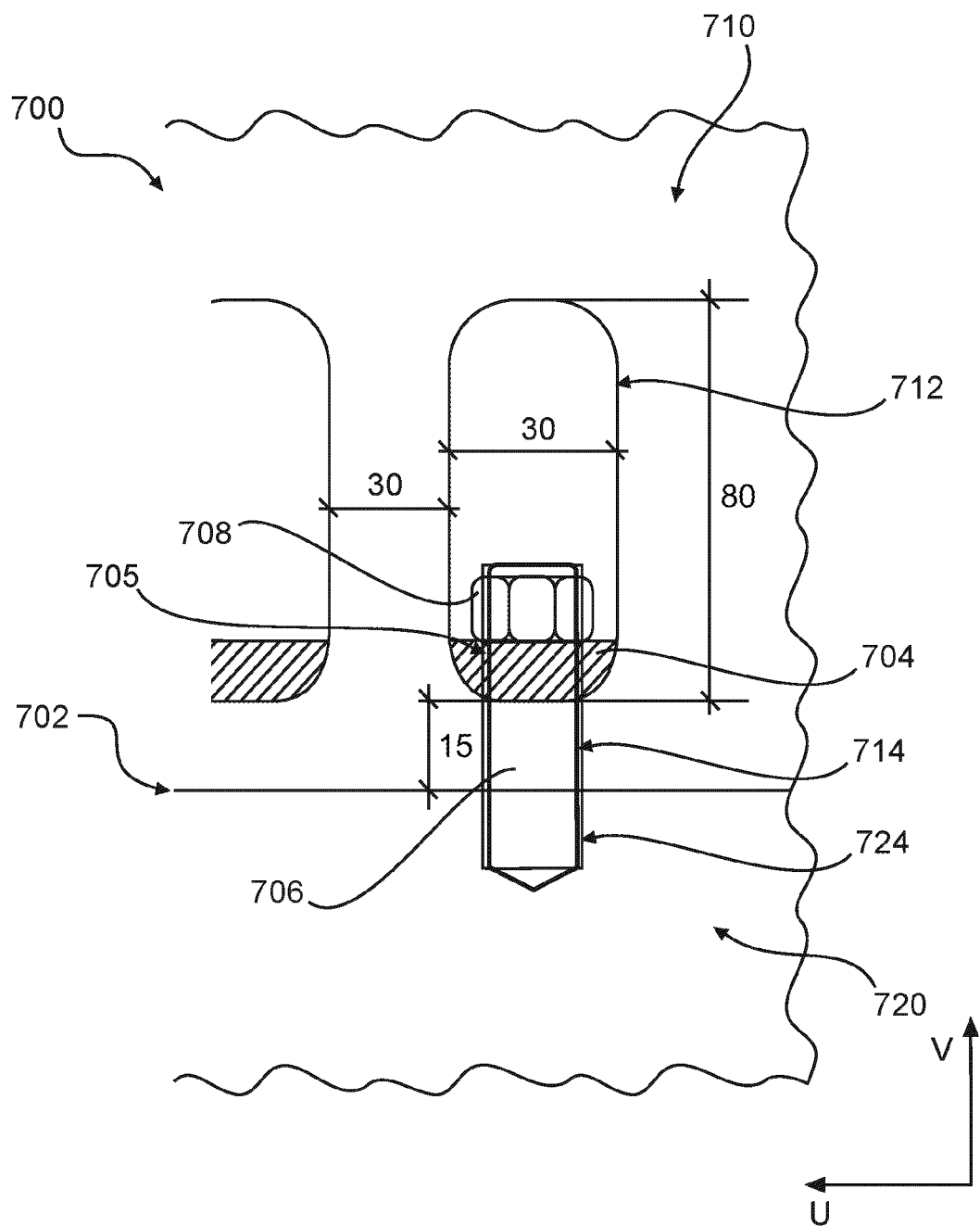
FIG. 5 shows a schematic two-dimensional detail view of an exemplary embodiment of a wind turbine tower section.

FIG. 5 shows a schematic two-dimensional detail view of a wind turbine tower section. The tower section has a first casing segment 710 and a second casing segment 720 which abut against one another with their horizontal joint sides at a horizontal joint 702. The first casing segment 710 has a first cutout 712, proceeding from which a first passage opening 714 leads to the horizontal joint side. The second casing segment 720 has, correspondingly to said first passage opening 714, a second fastening opening 724.

A first fastening element 706 is arranged firmly, but preferably releasably, in the second fastening opening 724. Proceeding from the second fastening opening 724, the first fastening element 706 extends into the first cutout 712 through the first passage opening 714 and through a transverse bolt opening 705 of a transverse bolt 704 which is arranged in the first cutout 712. The first fastening element 706 is secured by a nut 708 in the first cutout 712. The nut 708 is supported at its side facing toward the horizontal joint side on the transverse bolt 704.

The first fastening side of the cutout 712 is of concave form. The transverse bolt 704 has a convex side, which faces toward the first fastening side. The convex side, facing toward the first fastening side, of the transverse bolt 704 is of semicircle-like form. That side of the transverse bolt 704 which faces away from the fastening side is of substantially planar form. This planar formation of said side of the transverse bolt 704 facing away from the first fastening side allows it to act as a bearing surface for the nut 708.

Figure 6:
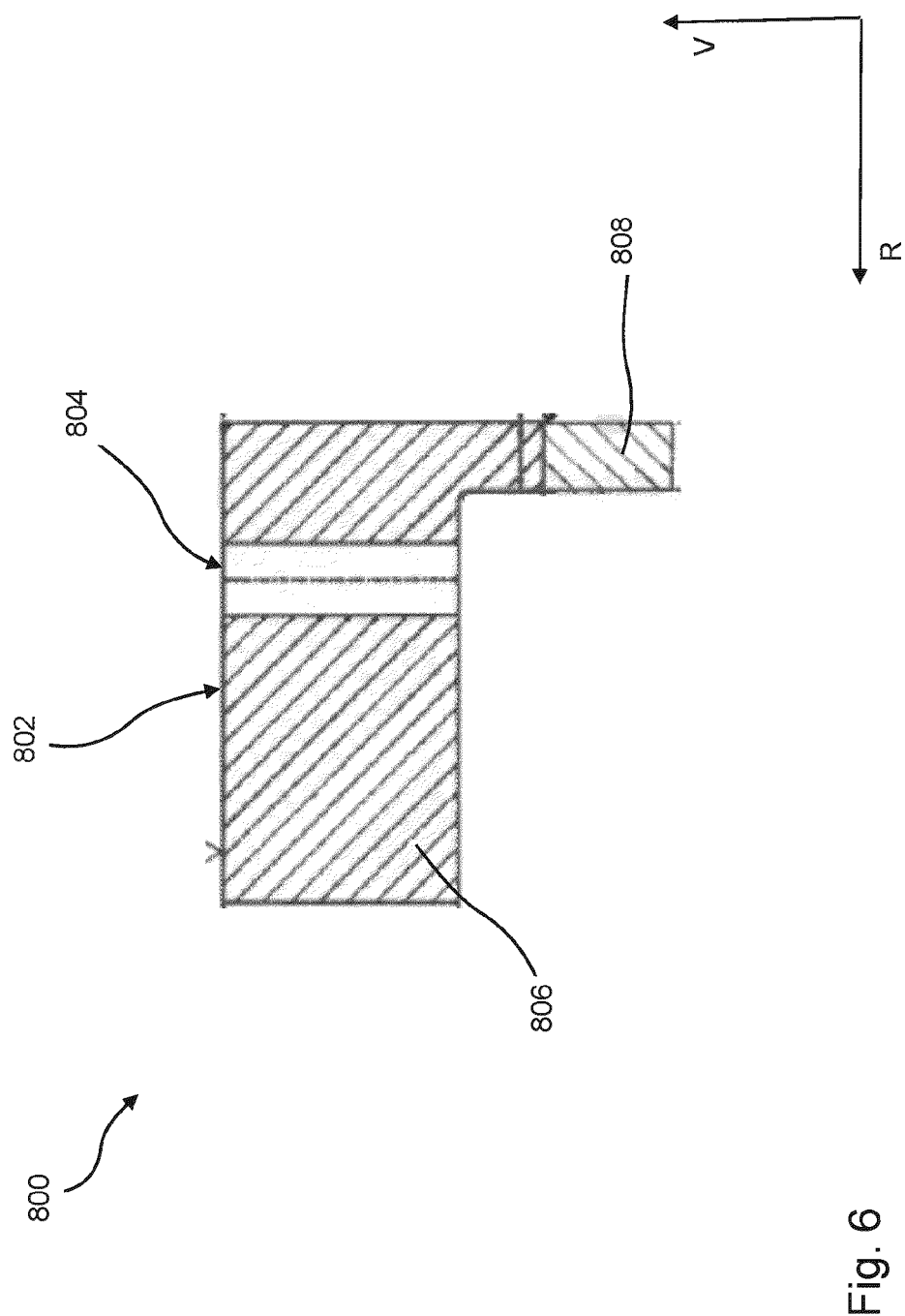
FIG. 6 shows a flange for connection of tower segments that is known in the prior art.

FIG. 6 shows a flange for connection of tower segments that is known in the prior art. The relatively thin-walled segment wall 808 of the segment 800 ends in a solid flange 806. The flange 806 has a multiplicity of flange openings 804 by way of which the flange 806 can be arranged and fastened on a correspondingly oppositely situated flange. The flange 806 of the segment 800 abuts with its horizontal joint side 802 against a correspondingly further flange.

Figure 7:
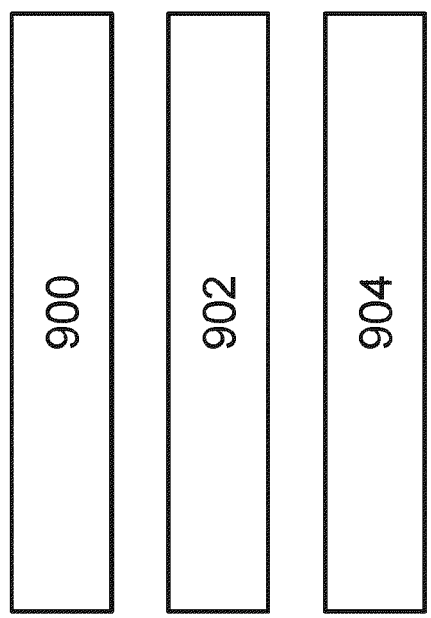
FIG. 7 shows a schematic method for producing a steel tower ring segment.

FIG. 7 shows a schematic method for producing a steel tower ring segment. The method comprises providing 900 a casing segment having a first thickening region which adjoins a first horizontal joint side. The method shown furthermore comprises forming 902 a first cutout in the first thickening region, wherein the first cutout is spaced apart from the first horizontal joint side. Also shown is the method step of forming 904 a first passage opening which leads from the first cutout to the first horizontal joint side.

Figure 8:
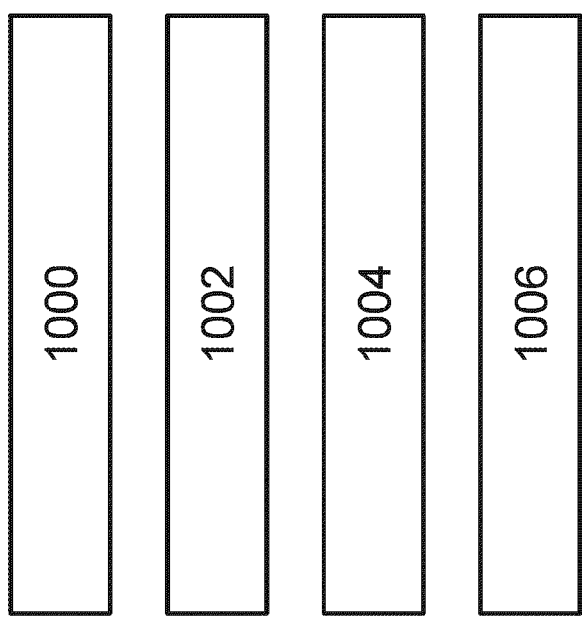
FIG. 8 shows a schematic method for producing a wind turbine tower section.

FIG. 8 shows a schematic method for producing a wind turbine tower section. The method comprises the step of providing 1000 a first steel tower ring segment according to at least one of the above-described embodiment variants. Furthermore, the method step of providing 1002 a second steel tower ring segment is shown. The second steel tower ring segment comprises a second casing segment with a segment height, with a segment length in the segment circumferential direction, with a second segment thickness, and with a second horizontal joint side.

The second casing segment has a second thickening region in a region adjoining the second horizontal joint side, wherein the second thickening region has a second thickening thickness which is larger than the second segment thickness. Proceeding from the second horizontal joint side, a second fastening opening is arranged in the second thickening region. The second fastening opening is preferably in the form of a blind hole.

The method shown in FIG. 8 furthermore comprises the step of arranging 1004 the first steel tower ring segment and the second steel tower ring segment with the first horizontal joint side and the second horizontal joint side against one another in such a way that the first passage opening and the second fastening opening share a common passage axis.

Also shown is the method step of arranging 1006 a fastening element in the first passage opening and in the second fastening opening. This may in particular comprise or be inserting and/or screwing a screw firstly in the first passage opening and then in the second fastening opening, or inserting and/or screwing in a threaded bolt.

Figure 9:
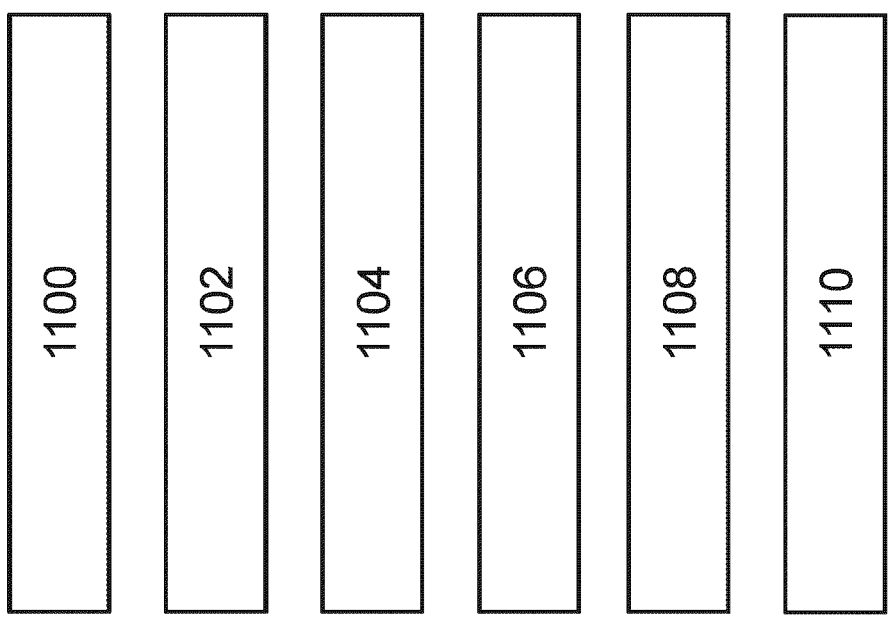
FIG. 9 shows a further schematic method for producing a wind turbine tower section.

FIG. 9 shows a further schematic method for producing a wind turbine tower section. The method comprises the step of providing 1100 a first steel tower ring segment according to at least one of the above-described embodiment variants. The method shown furthermore comprises the step of providing 1102 a second steel tower ring segment comprising a second casing segment with a segment height, with a segment length in the segment circumferential direction, with a second segment thickness, and with a second horizontal joint side.

The second casing segment has a second thickening region in a region adjoining the second horizontal joint side. Furthermore, the second thickening region has a second thickening thickness which is larger than the second segment thickness. Proceeding from the second horizontal joint side, a second fastening opening, which is preferably in the form of a blind hole, is arranged in the second thickening region.

The method shown in FIG. 9 furthermore has the step of arranging 1104 a transverse bolt with a transverse bolt opening in the first cutout. Also shown is the step of fastening 1106, in particular by screwing-in, a first fastening element, in particular a threaded bolt, in the second fastening opening. The method furthermore comprises the step of arranging 1108 the first horizontal joint side and the second horizontal joint side against one another in such a way that the first fastening element projects into the first cutout through the first passage opening and the transverse bolt opening. The method furthermore comprises arranging 1110 a fixing element, for example a nut and/or an expansion sleeve, on the fastening element in such a way that the first steel tower ring segment and the second steel tower ring segment are connected to one another.

REFERENCE SIGNS

10 Joint
12 First fastening element
20 Tower section
22 Fastening element
40 Tower section
42 Fastening element
44 Fastening element
46 Fastening element
48 Fastening element
50 Fastening element
52 Fastening element
54 Joint
100 Wind turbine
102 Tower
104 Nacelle
106 Rotor
108 Rotor blades
110 Spinner
120 Tower section
122 First steel tower ring segment
124 Second steel tower ring segment
200 First steel tower ring segment
202 First casing segment
210 First segment wall
212 First segment thickness
220 Transition region
230 Thickening region
232 Thickening thickness
240 First cutout
242 First fastening side
250 First passage opening
300 Second steel tower ring segment
302 Second casing segment
310 Second segment wall
312 Second segment thickness
320 Transition region
330 Thickening region
332 Thickening thickness 360 Fastening opening
402 First casing segment
430 First thickening region
440 Cutout
442 Passage opening
444 Cutout
446 Passage opening
448 Cutout
449 Passage opening
460 Fastening opening
462 Fastening opening
464 Fastening opening
502 Second casing segment
530 Second thickening region
540 Cutout
542 Passage opening
544 Cutout
546 Passage opening
548 Cutout
549 Passage opening
560 Fastening opening
562 Fastening opening
564 Fastening opening
600 Tower section
602 Joint
604 Transverse bolt
605 Transverse bolt opening
606 First fastening element
608 Nut
610 First casing segment
612 First cutout
614 First passage opening
620 Second casing segment
624 Second fastening opening
700 Tower section
702 Joint
704 Transverse bolt
705 Transverse bolt opening
706 First fastening element
708 Nut
710 First casing segment
712 First cutout
714 First passage opening
720 Second casing segment
724 Second fastening opening
800 Segment
802 Horizontal joint side
804 Flange opening
806 Flange
808 Segment wall
R Radial direction
U Circumferential direction
V Vertical direction

The invention claimed is:

1. A steel tower ring segment for a wind turbine tower section, comprising
a first casing segment having:
a segment height,
a segment length in a segment circumferential direction,
a first segment thickness, and
a first horizontal joint side,
wherein the first casing segment has a first thickening region in a region adjoining the first horizontal joint side, wherein:
the first thickening region has a first thickening thickness, and
the first thickening thickness is larger than the first segment thickness,
wherein the first thickening region has a first cutout, wherein the first cutout is arranged spaced apart from the first horizontal joint side, and
wherein a first passage opening leads from the first cutout to the first horizontal joint side.

2. The steel tower ring segment as claimed in claim 1, wherein the first passage opening has a passage axis oriented substantially parallel to the segment height.

3. The steel tower ring segment as claimed in claim 2, wherein:
proceeding from the first horizontal joint side, a first fastening opening is arranged in the first thickening region, a fastening opening axis is oriented substantially parallel to the passage axis of the first passage opening, and
the first fastening opening is arranged offset from the first passage opening in the segment circumferential direction.

4. The steel tower ring segment as claimed in claim 1, wherein the first cutout extends completely through the first thickening region in a direction of the first segment thickness.

5. The steel tower ring segment as claimed in claim 1, wherein:
a first fastening side, facing toward the first horizontal joint side, of the first cutout has a planar surface, wherein the planar surface adjoins the passage opening, and/or
the first fastening side is concave shaped, and a transverse bolt with a convex bearing side is configured to be arranged on the first fastening side, and/or
the first fastening side has a trough shape, wherein a trough base is oriented in a direction of the first thickening thickness, and the cross section orthogonal to the direction of the first thickening thickness is semicircle shaped, and a transverse bolt with a semicircle shaped cross section is configured to be arranged on the first fastening side.

6. The steel tower ring segment as claimed in claim 1, wherein the first thickening region has a first transition region, wherein, in the transition region, a casing segment thickness increases from the first segment thickness to the first thickening thickness.

7. The steel tower ring segment as claimed in claim 6, wherein the casing segment thickness increases continuously from the first segment thickness to the first thickening thickness.

8. The steel tower ring segment as claimed in claim 1, wherein:
orthogonally to the segment height and orthogonally to the segment circumferential direction, the casing segment extends in a radial direction,
radially, the first thickening region projects in a first direction and in a second direction, wherein the second direction is directed oppositely the first direction, and
the first thickening region projects with a same projection length in the first direction and in the second direction.

9. The steel tower ring segment as claimed in claim 1, comprising a plurality of first passage openings and/or a plurality of first fastening openings.

10. A wind turbine tower section comprising:
the first steel tower ring segment as claimed in claim 1, and
a second steel tower ring segment, wherein the second steel tower ring segment comprises a second casing segment with a segment height, a segment length in the segment circumferential direction, a second segment thickness, and a second horizontal joint side, wherein the second casing segment has a second thickening region in a region adjoining the second horizontal joint side, wherein the second thickening region has a second thickening thickness that is larger than the second segment thickness, wherein, proceeding from the second horizontal joint side, a second fastening opening is arranged in the second thickening region, wherein the first steel tower ring segment and the second steel tower ring segment abut one another with the first horizontal joint side and the second horizontal joint side in such a way that the first passage opening and the second fastening opening share a common passage axis, and wherein a first fastening element is arranged in the first passage opening and in the second fastening opening in such a way that the first steel tower ring segment and the second steel tower ring segment are connected to one another.

11. The wind turbine tower section as claimed in claim 10, wherein:

proceeding from the first horizontal joint side, a first fastening opening is arranged in the first thickening region, wherein the first fastening opening is arranged offset from the first passage opening in the segment circumferential direction, a second cutout is arranged in the second thickening region, wherein a second passage opening leads from the second cutout to the second horizontal joint side, the first passage opening and the second passage opening are arranged offset to one another in the segment circumferential direction, and a second fastening element is arranged in the second passage opening and the first fastening opening.

12. The wind turbine tower section as claimed in claim 10, wherein:

the first fastening element is arranged in the second fastening opening and projects into the first cutout through the first passage opening, and a first transverse bolt with a transverse bolt opening is arranged in the first cutout, and the first fastening element extends through the transverse bolt opening, wherein the first fastening element is coupled to the transverse bolt in such a way that brings about a firm connection between the first steel tower ring segment and the second steel tower ring segment.

13. The wind turbine tower section as claimed in claim 10, wherein a first fastening side has a concave cross section, and a transverse bolt has a convex bearing side corresponding to the first fastening side.

14. A wind turbine tower comprising at least one wind turbine tower section as claimed in claim 10.

15. A wind turbine comprising the wind turbine tower as claimed in claim 14.

16. The wind turbine tower section as claimed in claim 10, wherein the second fastening opening is a blind hole.

17. A method for producing a wind turbine tower section, comprising:

providing the first steel tower ring segment as claimed in claim 1, providing a second steel tower ring segment comprising a second casing segment with a segment height, a segment length in a segment circumferential direction, a second segment thickness, and a second horizontal joint side, wherein the second casing segment has a second thickening region in a region adjoining the second horizontal joint side, wherein the second thickening region has a second thickening thickness, the second thickening thickness being larger than the second segment thickness, wherein, proceeding from the second horizontal joint side, a second fastening opening is arranged in the second thickening region, arranging the first steel tower ring segment and the second steel tower ring segment with the first horizontal joint side and the second horizontal joint side against one another in such a way that the first passage opening and the second fastening opening share a common passage axis, arranging a fastening element in the first passage opening and in the second fastening opening.

18. A method for producing a wind turbine tower section, comprising:

providing the first steel tower ring segment as claimed in claim 1, providing a second steel tower ring segment comprising a second casing segment with a segment height, a segment length in the segment circumferential direction, a second segment thickness, and a second horizontal joint side, wherein the second casing segment has a second thickening region in a region adjoining the second horizontal joint side, wherein the second thickening region has a second thickening thickness, the second thickening thickness being larger than the second segment thickness, wherein, proceeding from the second horizontal joint side, a second fastening opening is arranged in the second thickening region, arranging a transverse bolt with a transverse bolt opening in the first cutout, fastening a first fastening element in the second fastening opening, arranging the first horizontal joint side and the second horizontal joint side against one another in such a way that the first fastening element projects into the first cutout through the first passage opening and the transverse bolt opening, arranging a fixing element on the fastening element in such a way that the first steel tower ring segment and the second steel tower ring segment are connected to one another.

19. The method as claimed in claim 18, wherein the first fastening element is a threaded bolt.

20. A method for producing a steel tower ring segment for a wind turbine tower section, the method comprising:

forming a first cutout in a first thickening region of a casing segment, wherein the first thickening region adjoins a first horizontal joint side, wherein the first cutout is spaced apart from the first horizontal joint side, forming a first passage opening which leads from the first cutout to the first horizontal joint side.

* * * * *